United States Patent
Yasuda

(10) Patent No.: US 7,310,113 B2
(45) Date of Patent: Dec. 18, 2007

(54) CAMERA FOR AUTOMATICALLY ADJUSTING IMAGE BRIGHTNESS FOR AN IMAGE ON A DISPLAY

(75) Inventor: Hidemasa Yasuda, Asaka (JP)

(73) Assignee: Fujifilm Corporation, Tokyo (JP)

( * ) Notice: Subject to any disclaimer, the term of this patent is extended or adjusted under 35 U.S.C. 154(b) by 649 days.

(21) Appl. No.: 09/788,496

(22) Filed: Feb. 21, 2001

(65) Prior Publication Data

US 2001/0015761 A1 Aug. 23, 2001

(30) Foreign Application Priority Data

Feb. 21, 2000 (JP) ............................. 2000-043125

(51) Int. Cl.
*H04N 5/235* (2006.01)
*H04N 5/20* (2006.01)
*H04N 5/57* (2006.01)

(52) U.S. Cl. .................. 348/230.1; 348/255; 348/687; 382/274

(58) Field of Classification Search ............. 348/216.1, 348/229.1, 230.1, 333.01, 255, 333.12, 257, 348/258, 362, 364, 366, 259, 260, 673, 687, 348/688, 689, 603; 358/461, 446, 447; 382/274
See application file for complete search history.

(56) References Cited

U.S. PATENT DOCUMENTS

| | | | | |
|---|---|---|---|---|
| 4,731,865 A | * | 3/1988 | Sievenpiper | 382/274 |
| 4,754,332 A | * | 6/1988 | Bergquist | 348/576 |
| 5,065,248 A | * | 11/1991 | Homma | 348/229.1 |
| 5,448,293 A | * | 9/1995 | Kogane et al. | 348/229.1 |
| 5,504,538 A | * | 4/1996 | Tsujihara et al. | 348/673 |
| 5,530,474 A | * | 6/1996 | Takei | 348/224.1 |
| 5,546,134 A | * | 8/1996 | Lee | 348/673 |
| 5,572,253 A | * | 11/1996 | Ueda | 348/222.1 |
| 5,724,456 A | * | 3/1998 | Boyack et al. | 382/274 |
| 5,831,676 A | * | 11/1998 | Takahashi et al. | 348/229.1 |
| 6,120,435 A | * | 9/2000 | Eino | 600/118 |
| 6,163,342 A | * | 12/2000 | Suzuki | 348/364 |
| 6,166,719 A | * | 12/2000 | Cariffe | 345/690 |
| 6,518,998 B1 | * | 2/2003 | Christoff et al. | 348/216.1 |
| 6,567,123 B1 | * | 5/2003 | Hashimoto | 348/229.1 |
| 6,665,015 B1 | * | 12/2003 | Watanabe et al. | 348/362 |
| 6,690,424 B1 | * | 2/2004 | Hanagata et al. | 348/364 |

(Continued)

FOREIGN PATENT DOCUMENTS

JP 59126311 A * 7/1984

(Continued)

*Primary Examiner*—John M Villecco
(74) *Attorney, Agent, or Firm*—Birch, Stewart, Kolasch & Birch, LLP

(57) ABSTRACT

Image signals outputted from a CCD to an image signal processing circuit, which performs A/D conversion, YC signal processing to convert the image signals into video signals of NTSC or the like and outputs video signals after D/A conversion. A microcomputer receives the video signals from the image signal processing circuit and determines a brightness level of the video signals. An EEPROM stores a data table showing the relationship between a correction amount and the brightness level, and the microcomputer obtains the correction amount from the EEPROM. The microcomputer corrects the video signals according to the correction amount before the D/A conversion, and the image signal processing circuit outputs the corrected video signals to a displaying device controlling circuit, and a displaying device displays an image.

10 Claims, 5 Drawing Sheets

U.S. PATENT DOCUMENTS

| | | | |
|---|---|---|---|
| 6,750,906 B1 * | 6/2004 | Itani et al. | 348/229.1 |
| 7,027,105 B2 * | 4/2006 | Lee et al. | 348/687 |
| 7,110,046 B2 * | 9/2006 | Lin et al. | 348/673 |
| 2004/0165070 A1 * | 8/2004 | Yoshida et al. | 348/207.2 |
| 2005/0140830 A1 * | 6/2005 | Kim et al. | 348/673 |
| 2005/0237432 A1 * | 10/2005 | Yokoyama et al. | 348/687 |
| 2005/0280745 A1 * | 12/2005 | Takeda et al. | 348/687 |
| 2006/0012718 A1 * | 1/2006 | Lee | 348/687 |
| 2006/0082676 A1 * | 4/2006 | Jenkins et al. | 348/362 |
| 2006/0082677 A1 * | 4/2006 | Donomae et al. | 348/362 |

FOREIGN PATENT DOCUMENTS

| | | | |
|---|---|---|---|
| JP | 4324767 | | 11/1992 |
| JP | 06054238 | | 2/1994 |
| JP | 06311392 | A * | 11/1994 |
| JP | 09200595 | A * | 7/1997 |

* cited by examiner

F I G. 2
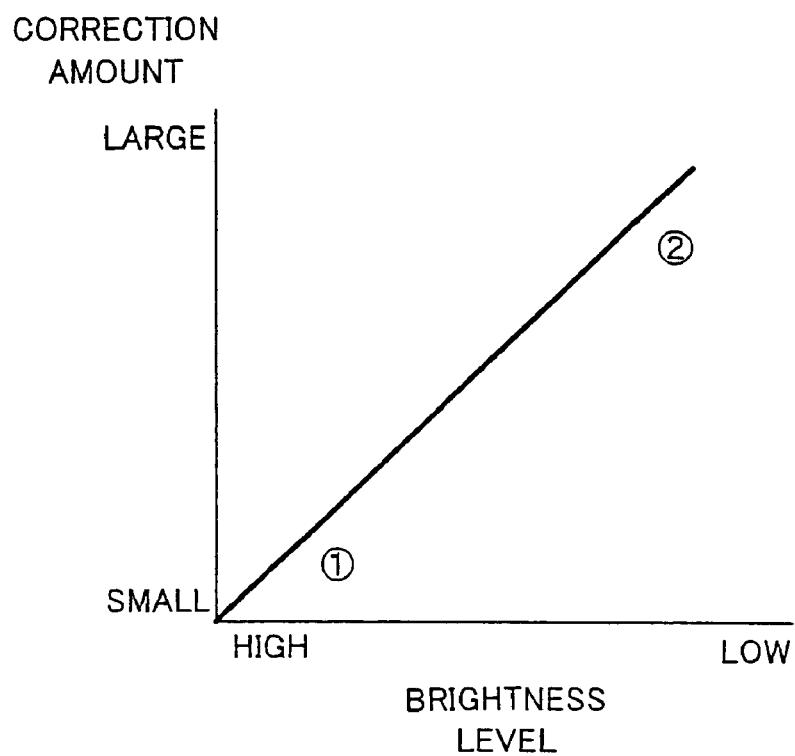
F I G. 3 (a)
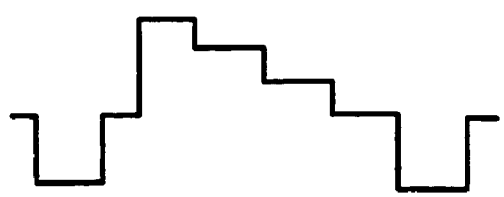
BEFORE CORRECTION
F I G. 3 (b)
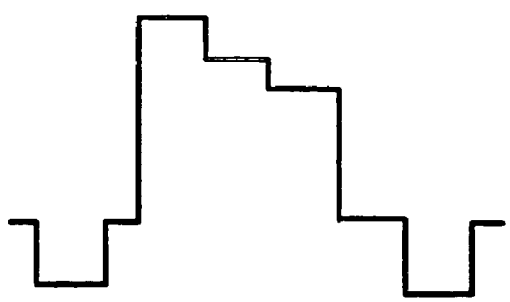
AFTER CORRECTION

CAMERA FOR AUTOMATICALLY ADJUSTING IMAGE BRIGHTNESS FOR AN IMAGE ON A DISPLAY

BACKGROUND OF THE INVENTION

1. Field of the Invention

The present invention relates generally to a camera, and more particularly to a camera that converts light into electric signals with an imaging device and displays a captured image on a displaying device such as a liquid crystal monitor.

2. Description of Related Art

Japanese patent provisional publication No. 4-324767 discloses a TV camera device that has an imaging device (CCD) with a shutter and an amplifier whose gain is variable. The TV camera device determines a brightness level of video signals on the field-by-field basis, and controls the shutter speed and the gain of the amplifier to obtain appropriate video signals.

Japanese patent provisional publication No. 6-54238 discloses a video camera that has a variable gain amplifier circuit for adjusting a brightness level of video signals to be outputted to a viewfinder. The video camera inputs the video signals obtained by an imaging system to a microcomputer, which determines the brightness level. The video camera controls the gain according to the brightness to obtain appropriate video signals.

However, in a method where a gain is controlled, if the gain is corrected beyond its effective level, the SN ratio is greatly lowered to make the image uneasy to see. For this reason, in the above methods, the correction of the video signals is finished before the SN ratio is lowered, and thus the image is not easy to see.

To address this problem, a digital camera with a displaying device such as a liquid crystal monitor has a switch for adjusting the brightness of the image on the displaying device. The user manually controls the brightness of the image with the switch when the subject is dark.

SUMMARY OF THE INVENTION

In view of the foregoing, it is an object of the present invention to provide a camera that can automatically adjust a brightness of an image displayed on a displaying device to make the image easy to see without lowering an SN ratio and to make the camera easy to operate.

To achieve the above-mentioned object, the present invention is directed to a camera that captures an image with an imaging part and displays the image on a displaying device, wherein the camera determines a brightness level of video signals obtained by the imaging part and automatically corrects the video signals according to the determined brightness level and outputs the corrected video signals to the displaying device.

According to the present invention, the camera corrects the video signals according to the determined brightness level and outputs the corrected video signals to the displaying device. Thus, the brightness level of the video signals is automatically adjusted when the subject is dark, and this makes the image easy to see. The displaying device may be a liquid crystal display, a viewfinder or the like. It may be incorporated in the camera body, and it may be separate from the camera body and able to communicate with the camera by wire or wireless through a signal transmitting device.

To achieve the above-mentioned object, the present invention is directed to a camera comprising: an imaging part that includes imaging devices; a signal processing part that processes signals outputted from the imaging part; a brightness determining part that receives video signals outputted from the signal processing part and determines a brightness level of the received video signals; a correction amount determining part that determines a correction amount for the video signals according to the brightness level of the video signals determined by the brightness determining part; a correcting part that corrects the video signals according to the correction amount determined by the correction amount determining part; and an outputting part that outputs video signals corrected by the correction part to a displaying device.

A data table showing the relationship between the correction amount and the brightness level may be stored in a storage device such as a memory so that the correction amount is found from the data table according to the brightness level.

The signal processing part may comprise an A/D converter that converts the signals outputted from the imaging part into digital signals, and a D/A converter that converts the video signals corrected by the correcting part into analog signals, and the correcting part may correct the video signals before the video signals are converted into the analog signals by the D/A converter. In this case, a conventional variable gain amplifier can be omitted to decrease the cost since the correcting part corrects the video signals before the D/A conversion, and the camera can make the image easy to see without lowering the SN ratio.

To achieve the above-mentioned object, the present invention is directed to a camera comprising: an imaging part that includes imaging devices; a variable gain amplifier that amplifies signals outputted from the imaging part; a signal processing part that processes signals amplified by the variable gain amplifier; a brightness determining part that receives video signals outputted from the signal processing part and determines a brightness level of the received video signals; a gain controlling part that controls a gain of the variable gain amplifier according to the brightness level of the video signals; a correction amount determining part that determines a correction amount for the video signals according to the brightness level of the video signals determined by the brightness determining part; a correcting part that corrects the video signals according to the correction amount determined by the correction amount determining part; and an outputting part that outputs video signals corrected by the correction part to a displaying device.

According to the present invention, though the amplification has a limitation not to lower the SN ratio, the combination of the amplification by the variable gain amplifier and the correction by the correcting part can automatically correct the video signals. Therefore, the camera can automatically adjust the brightness to make the image easy to see.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a graph diagram showing a relationship between a correction value and a brightness level of video signals;

FIGS. 3(a) and 3(b) are diagrams showing waveforms of video signal before correction processing and video signal after the correction processing, respectively;

DETAILED DESCRIPTION OF THE PREFERRED EMBODIMENT

This invention will be described in further detail by way of example with reference to the accompanying drawings.

Figure 1:
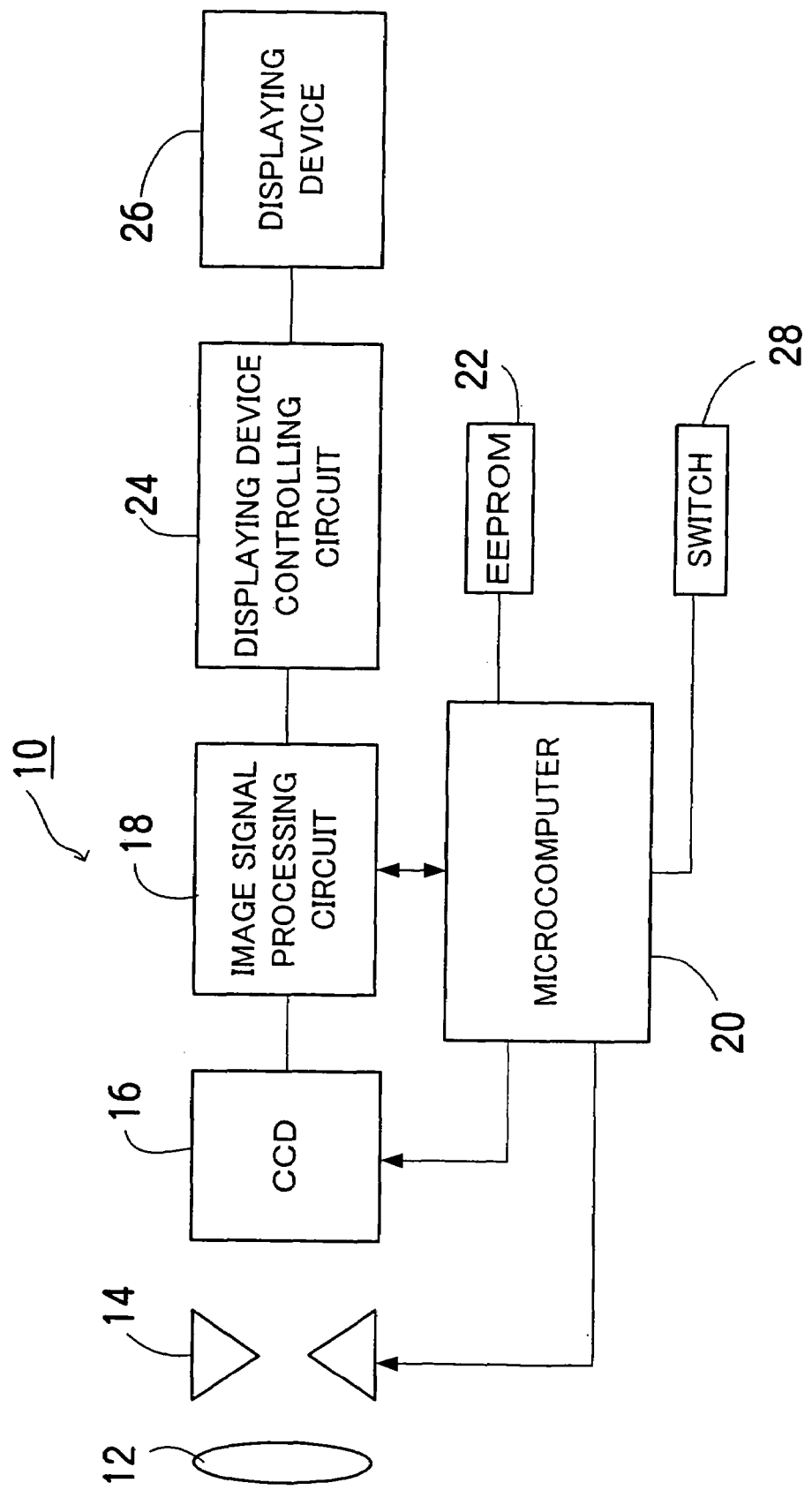
FIG. 1 is a block diagram showing a first embodiment of a camera according to the present invention.

FIG. 1 is a block diagram showing a first embodiment of a camera 10 according to the present invention. As shown in FIG. 1, the camera 10 comprises a taking lens 12, a diaphragm 14, an imaging device (CCD) 16, an imaging signal processing circuit 18, a microcomputer 20, an EEPROM 22, a display controlling circuit 24, a displaying device 26 and a switch 28 for choosing to command correction processing or not.

The taking lens 12 is composed of one or more lenses, and it may have a fixed focus or it may be a zoom lens or a step zoom lens that changes its focal length.

Incident lights arrive at the CCD 16 through the taking lens 12 and the diaphragm 14, and the CCD 16 converts the lights into electric signals. The CCD 16 is driven by commands from the microcomputer 20, and signal electric charges stored in light-receiving sensors are sequentially read as the corresponding electric signals by CCD driving pulses. The CCD 16 has a drain through a shutter gate for draining unnecessary electric charges, and the shutter gate is controlled by shutter gate pulses so that the electric charges stored in the sensors are drained. The CCD 16 has the electronic shutter function that controls the exposure time (shutter speed) with the shutter gate pulses.

The signals read from the CCD 16 are inputted to the imaging signal processing circuit 18, which comprises an A/D converter, a gamma correcting circuit, a YC signal generating circuit, an encoder and a D/A converter to process the imaging signals in accordance with commands from the microcomputer 20. In the imaging signal processing circuit 18, the imaging signals outputted from the CCD 16 are converted into digital signals, and gamma processing and chroma signal processing are performed, and the encoder converts the signals into video signals of the NTSC or the like, and the video signals are converted into analog signals, which are inputted to the display controlling circuit 24.

The display controlling circuit 24 outputs signals that are needed for display to the displaying device 26 according to the video signals from the imaging signal processing circuit 18. The displaying device 26 displays an image according to the signals inputted from the display controlling circuit 24.

The imaging signal processing circuit 18 also outputs the video signals to the microcomputer 20. The microcomputer 20 controls the whole system and performs various processings. The microcomputer 20 sends diaphragm control signals to the diaphragm 14 for controlling the diaphragm according to the video signals from the imaging signal processing circuit 18 so that brightness levels of the video signals are optimum, and the microcomputer 20 sends shutter speed control signal to the CCD 16 for controlling the shutter speed.

Generally, the maximum shutter speed for an NTSC image is 1/60 second. Therefore, even if the diaphragm is increased and the shutter speed is 1/60 second, the brightness levels are not optimum in a dark place. If the microcomputer 20 determines that the brightness levels can not be optimum when only the diaphragm and the shutter speed are controlled, the microcomputer 20 performs the correction processing with reference to a data table stored in the EEPROM 22.

The data table stored in the EEPROM 22 shows correction amounts for obtaining appropriate brightness levels for display with respect to the brightness levels of the video signals. The microcomputer 20 obtains correction amounts (correction values) from the EEPROM 22 according to the brightness levels of the video signals received from the image signal processing circuit 18, which performs the correction processing for the video signals (luminance signals) before the D/A conversion in accordance with commands from the microcomputer 20. The video signals with appropriate brightness levels are inputted to the displaying device controlling circuit 24 and the displaying device 26 displays the image.

The switch 28 is used to choose to command the correction processing or not. The choice is inputted to the microcomputer 20, which sets one of a mode for performing the correction processing (correction mode) and a mode for not performing the correction processing (non-correction mode). This switch 28 may be omitted.

FIG. 2 shows the relationship between the correction values and the brightness levels of the video signals. As shown in FIG. 2, the lower the brightness level is, the larger the correction value is. The relationship does not necessary have the linearity, and the correction processing may not be performed when the brightness level of the video signal is higher than a predetermined level (the area denoted by ①) and the correction processing may be performed only when the brightness level is lower than the predetermined level (the area denoted by ②). The predetermined level is the limit level at which the brightness can be adjusted by the diaphragm and the shutter speed.

FIGS. 3(a) and 3(b) show waveforms of the video signal before the correction processing and the video signal after the correction processing, respectively. When the brightness levels of the video signal are low as shown in FIG. 3(a), if the video signal were inputted to the displaying device controlling circuit 24, the displayed image would be too dark to be seen. The correction processing raises the brightness levels of the video signal as shown in FIG. 3(b) to make the image bright and easy to see. The correction processing does not lower the SN ratio, unlike amplification by an amplifier. The correction processing is performed before synchronous signals are mixed with each other not to affect the synchronous signals.

Figure 4:
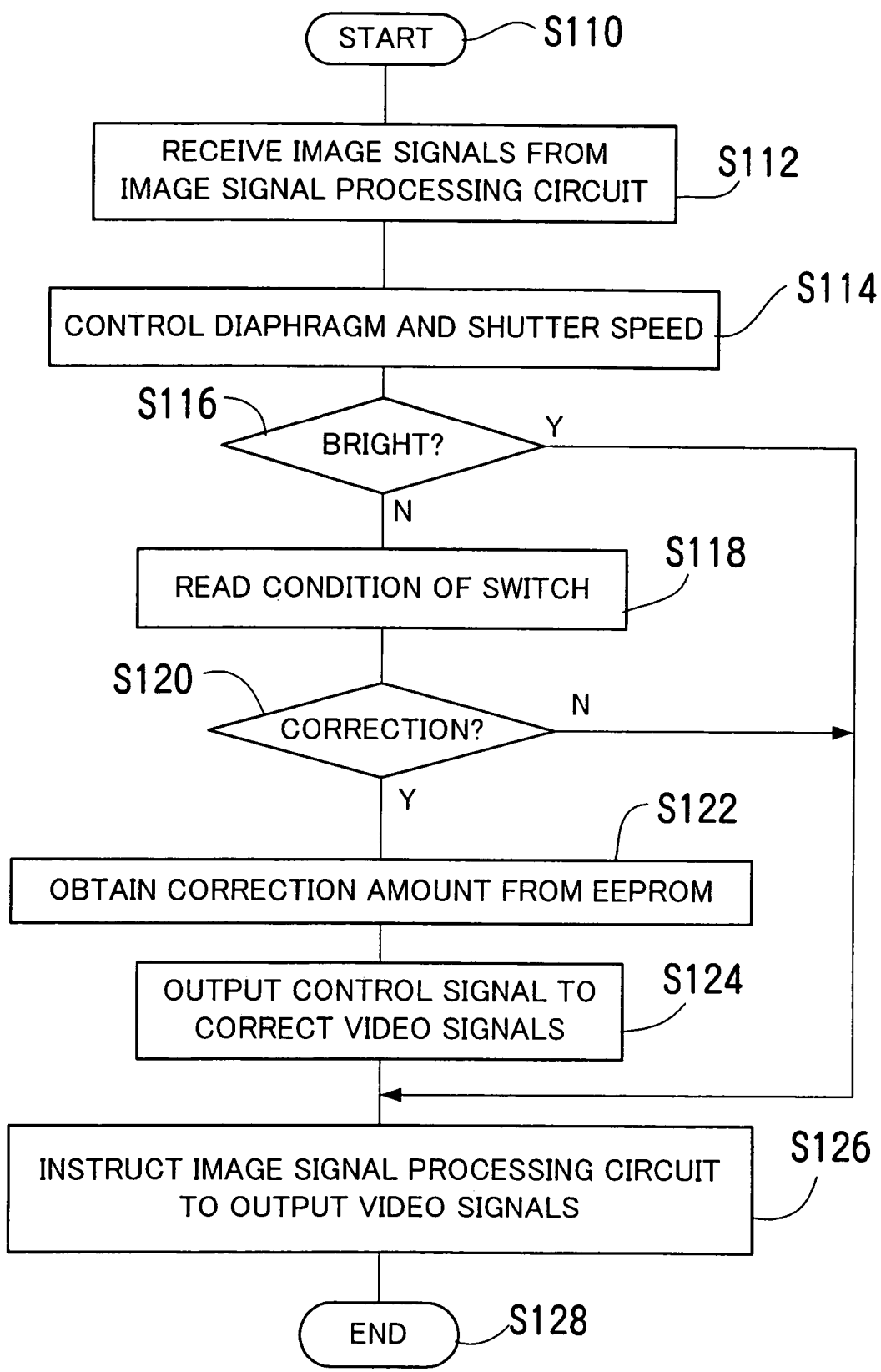
FIG. 4 is a flowchart showing a control procedure of a microcomputer of the camera in FIG. 1.

The operation of the camera 10 will now be explained. FIG. 4 is a flowchart showing the control procedure of the microcomputer 20 of the camera 10. After the processing starts (step 110), the microcomputer 20 receives the image signals from the image signal processing circuit 18 (step 112). Then, the microcomputer 20 calculates the exposure according to the image signals, and controls the diaphragm and the shutter speed (step 114).

Next, the microcomputer 20 determines whether the brightness level of the image signals is higher or lower than the predetermined level (step 116). The level of the luminance signal (Y signal) may be used, and the level of the G signal of R, G and B signals may be used.

If the brightness level of the image signals is higher than the predetermined level at step 116, the process goes to step 126 without the correction processing to command the image signal processing circuit 18 to input the image signals to the displaying device controlling circuit 24, and the displaying device 26 displays the image.

Meanwhile, if the brightness level of the image signals are lower than the predetermined level at step 116, the microcomputer 20 reads the condition of the switch 28 (step 118) and determines whether the correction mode has been set or the non-correction mode has been set (step 120). If the non-correction mode has been set at step 120, the process goes to step 126. In this case, the video signals are outputted from the image signal processing circuit 18 to the display device controlling circuit 24 without the correction processing.

If the correction processing has been set at step 120, the microcomputer 20 obtains the correction value from the EEPROM 22 according to the brightness level of the video signals, and then outputs the command (control signal) to the image signal processing circuit 18 for the correction processing (step 124).

On receiving the control signal, the image signal processing circuit 18 performs the correction processing. Then, the image signal processing circuit 18 outputs the video signals to the display device controlling circuit 24 (step 126). The displaying device 26 displays the image with the appropriate brightness, and the processing ends (step 128).

According to the camera 10 of the present invention, when the subject is dark, the correction processing is automatically performed to make the image easy to see. Thus, the user does not have to adjust the brightness of the displaying device by a knob or the like, and therefore the camera 10 is easy to operate. In addition, a variable gain amplifier can be omitted, and the structure of the camera 10 is simple and the cost is low. Also, the correction processing does not lower the SN ratio, unlike the conventional amplification by the amplifier.

Though the image can become easy to see by the correction processing, the image is largely different from the actual subject since the brightness of the image has been corrected. Therefore, it is preferable not to perform the correction processing when the image data is to be stored in a storage medium (not shown in FIG. 1). For example, when a moving image is being displayed, the correction processing is performed to make the image easy to see. When a shutter release button or a record button is pushed, the image data is stored in the storage medium without the correction processing.

The storage medium may be a memory card, a video tape and an optical disc, and it can be read and rewritten in an electronic way, a magnetic way, an optical way, or a way into which at least two of the ways are combined. A recording device that stores image data in the storage medium may be integrated in the camera body, and it may be separate from the camera body and able to communicate with the camera by wire or wireless through a signal transmitting device.

Figure 5:
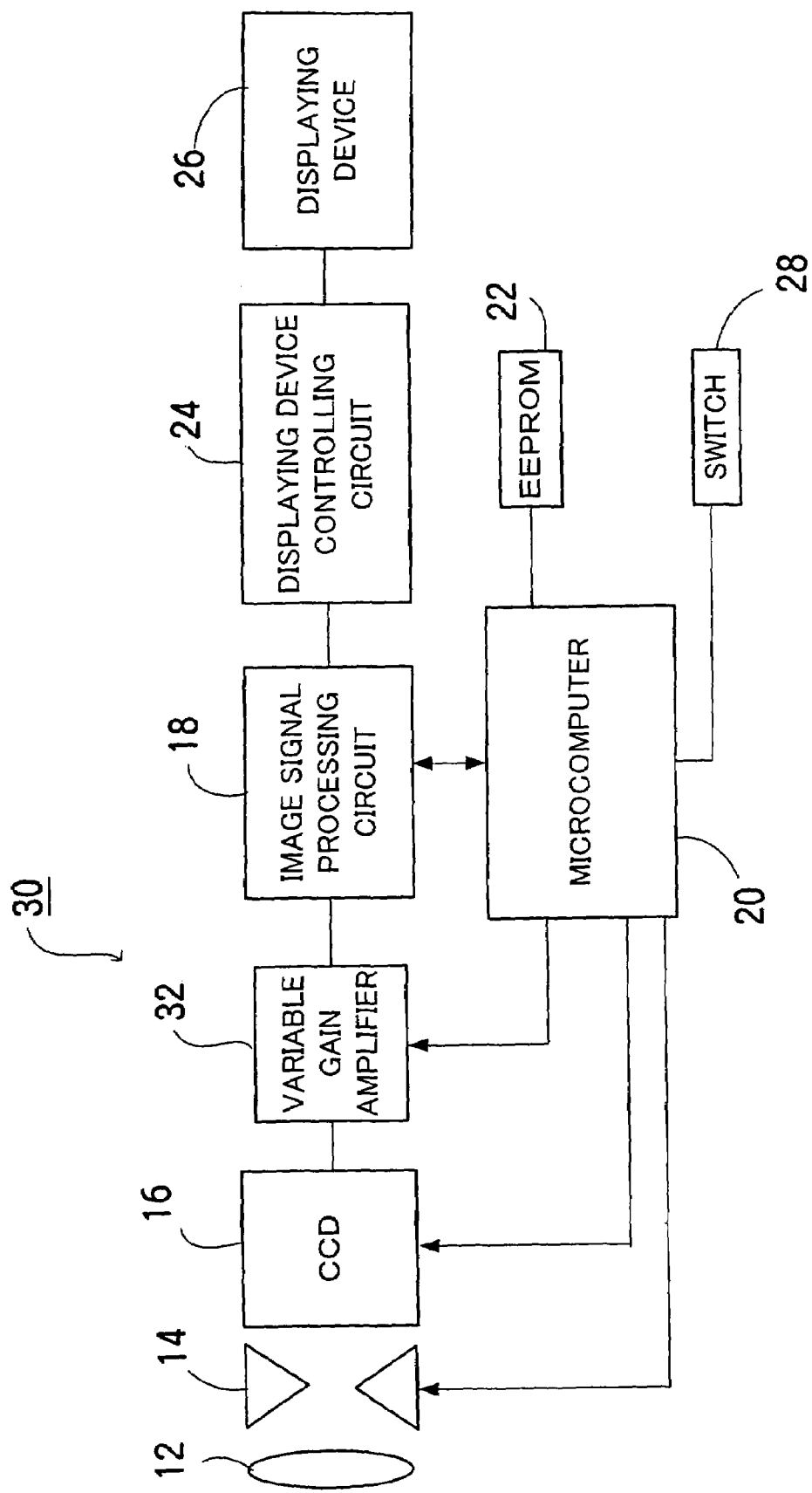
FIG. 5 is a block diagram showing a second embodiment of a camera according to the present invention.

FIG. 5 is a block diagram showing the second embodiment of the camera 30 according to the present invention. The same blocks as those in FIG. 1 are denoted by the same reference numerals, and they will not be explained again.

The camera 30 has a variable gain amplifier 32 that amplifies the image signals outputted from the CCD 16, and the amplified image signals are outputted to the image signal processing circuit 18. The gain of the variable gain amplifier 32 is determined according to a gain control signal inputted from the microcomputer 20. The microcomputer 20 controls the variable gain amplifier 32 according to the video signals received from the image signal processing circuit 18 so that the brightness levels of the video signals are appropriate. The EEPROM 22 stores a data table showing the relationship between the gain and the brightness level of the video signals, the microcomputer 20 obtains the optimum gain from the data table stored in the EEPROM 22.

Since the amplification by the amplifier has a limit, the camera 30 performs the amplification by the variable gain amplifier 32 and the correction processing to make the brightness levels of the video signals appropriate.

Figure 6:
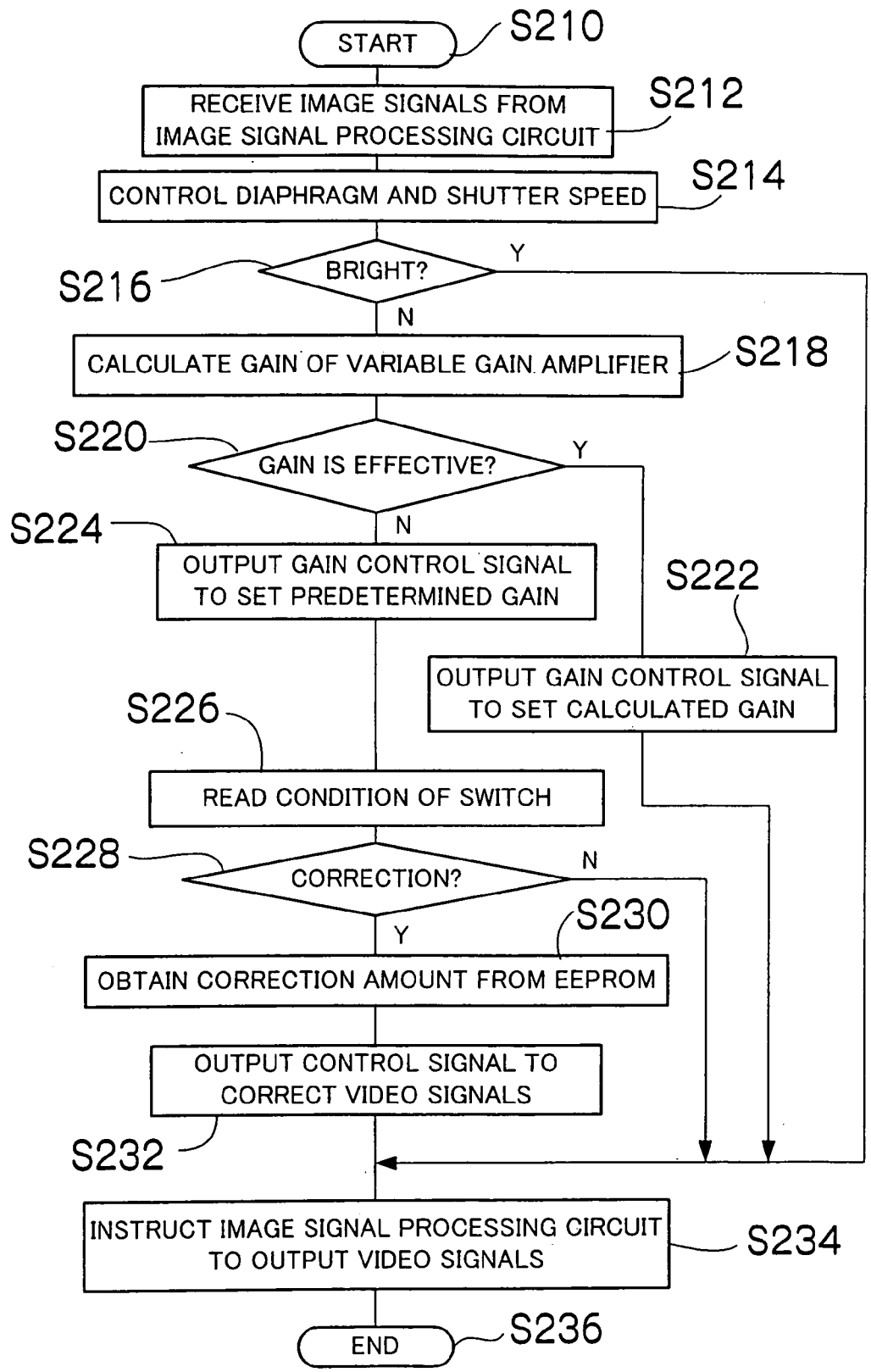
FIG. 6 is a flowchart showing a control procedure of the microcomputer of the camera in FIG. 5.

FIG. 6 is a flowchart showing the control procedure of the microcomputer 20 of the camera 30 in FIG. 5. After the processing starts (step 210), the microcomputer 20 receives the image signals from the image signal processing circuit 18 (step 212). Then, the microcomputer 20 calculates the exposure according to the image signals, and controls the diaphragm and the shutter speed (step 214).

Next, the microcomputer 20 determines whether the brightness level of the image signals is higher or lower than the predetermined level (step 216). If the brightness level of the image signals is higher than the predetermined level at step 216, the process goes to step 234 without the amplification and the correction processing to command the image signal processing circuit 18 to input the image signals to the displaying device controlling circuit 24, and the displaying device 26 displays the image.

Meanwhile, if the brightness level of the image signals is lower than the predetermined level at step 216, the microcomputer 20 finds the gain from the data table stored in the EEPROM 22. Then, the microcomputer 20 determines whether or not the gain is effective (step 220). A range of the effective gain for not lowering the SN ratio has been previously determined, and the microcomputer 20 determines whether or not the gain is within the range at step 220.

If yes, the microcomputer 20 outputs the gain control signal to the variable gain amplifier 32 to set the gain. The amplifier 32 amplifies the output signals from the CCD with the gain, and the amplified signals are outputted to the image signal processing circuit 18, which generates the video signals with appropriate brightness values.

Then, the process goes to step 234 to command the image signal processing circuit 18 to input the image signals to the displaying device controlling circuit 24, and the displaying device 26 displays the image.

If the gain is not within the range at step 220, the microcomputer 20 outputs a gain control signal for setting an effective gain to the variable gain amplifier 32 (step 224).

Then, the microcomputer 20 reads the condition of the switch 28 (step 226) and determines whether the correction mode has been set or the non-correction mode has been set (step 228). If the non-correction mode has been set, the process goes to step 234. In this case, the video signals are outputted from the image signal processing circuit 18 to the display device controlling circuit 24 without the correction processing.

If the correction processing has been set at step 228, the microcomputer 20 obtains the correction value from the EEPROM 22 according to the brightness level of the video signals, and then outputs the command (control signal) to the image signal processing circuit 18 for the correction processing (step 232).

On receiving the control signal, the image signal processing circuit 18 performs the correction processing. Then, the image signal processing circuit 18 outputs the video signals to the display device controlling circuit 24 (step 234). The displaying device 26 displays the image with the appropriate brightness, and the processing ends (step 236).

Also, in a camera with a zoom lens, the brightness changes from the wide-angle side to the telephoto side. Generally, the brightness of the lens and the brightness of the image when the lens is on the telephoto side are lower than those when the lens is on the wide-angle side. Japanese Patent Provisional Publication No. 5-2923 and 7-131701 discloses technology for automatically correcting the brightness of the lens and the brightness of the image with variable gain amplifiers.

In this invention, however, the video signals are automatically corrected according to the brightness level of the video signals obtained from the imaging part so that the brightness level of the outputted video signals are appropriate, and brightness can be automatically corrected even if the zoom lens moves.

As set forth hereinabove, the brightness level of the video signals obtained through the imaging part is determined and the video signals are automatically corrected to make the brightness level appropriate. This makes the image easy to see, and the user does not have to adjust the brightness of the displaying device by a knob or the like, and therefore the camera is easy to operate.

In addition, a variable gain amplifier can be omitted, and the structure of the camera is simple and the cost is low.

Also, the correction processing does not lower the SN ratio, unlike the conventional amplification by the amplifier.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera comprising:
    an imaging part that includes an imaging device;
    a variable gain amplifier that amplifies video signals outputted from the imaging part;
    a signal processing part that processes the video signals amplified by the variable gain amplifier;
    a brightness determining part that receives the video signals outputted from the signal processing part and determines a brightness level of the received video signals;
    a gain controlling part that controls a gain of the variable gain amplifier according to the brightness level of the video signals, wherein the gain of the variable gain amplifier is controlled to an gain value falling within an effective gain range and which does not permit a lowering of an SN ratio;
    a correction amount determining part that determines a correction amount for the video signals according to the brightness level of the video signals determined by the brightness determining part;
    a correcting part that corrects the video signals according to the correction amount determined by the correction amount determining part; and
    an outputting part that outputs the video signals corrected by the correction part to a displaying device.

2. A camera comprising:
    a taking lens;
    a diaphragm operatively connected to the taking lens;
    an imaging device operatively connected to the taking lens and the diaphragm;
    an image signal processing circuit having
        an A/D converter for converting analog image signals from the imaging device into digital image signals,
        a gamma correcting circuit,
        an image signal processing circuit adapted to perform gamma processing and chroma signal processing on the digital image signals, and
        a D/A converter adapted to convert the digital image signals into analog image signals;
    a display device controlling circuit adapted to output the analog image signals to a displaying device according to the analog image signals output from the image signal processing circuit; and
    a microcomputer operatively connected to an EEPROM,
    wherein said microcomputer is adapted to control the diaphragm according to the digital image signals from the image signal processing circuit, adapted to send shutter speed control signals to the imaging device for controlling camera shutter speed, and adapted to automatically determine if a determined brightness level of the digital image signals is lower than a predetermined value, and
    wherein said microcomputer is adapted to select a predetermined correction value from the EEPROM according to the determined brightness level of the digital image signals, and to output a command control signal to the image signal processing circuit for automatic correction processing of the digital image signals without lowering a SN ratio and before the digital image signals are converted into the analog image signals by the D/A converter, and
    further comprising a variable gain amplifier operatively connected between the imaging device and the A/D converter of the image signal processing circuit,
    wherein a gain of the variable gain amplifier is controlled by the microcomputer to provide an optimum gain value falling within an effective gain range provided by a data table within the EEPROM and which does not permit a lowering of the SN ratio.

3. The camera according to claim 2, further comprising a switch for choosing a command correction processing mode or a non-correction processing mode.

4. The camera according claim 2, wherein the microcomputer outputs the command control signal directly from the microcomputer to the image signal processing circuit.

5. A camera comprising:
    a taking lens;
    a diaphragm operatively connected to the taking lens;
    an imaging device operatively connected to the taking lens and the diaphragm;
    an image signal processing circuit having
        an A/D converter for converting analog image signals from the imaging device into digital image signals,
        a gamma correcting circuit,
        an image signal processing circuit adapted to perform gamma processing and chroma signal processing on the digital image signals, and
        a D/A converter adapted to convert the digital image signals into analog image signals;
    a display device controlling circuit adapted to output the analog image signals to a displaying device according to the analog image signals output from the image signal processing circuit; and
    a microcomputer operatively connected to an EEPROM,
    wherein said microcomputer is adapted to control the diaphragm according to the digital image signals from the image signal processing circuit, adapted to send shutter speed control signals to the imaging device for controlling camera shutter speed, and adapted to automatically determine if a determined brightness level of the digital image signals is lower than a predetermined value, and
    wherein said microcomputer is adapted to select a predetermined correction value from the EEPROM according to the determined brightness level of the digital image signals, and to output a command control signal to the image signal processing circuit for automatic correction processing of the digital image signals without lowering a SN ratio and before the digital image signals are converted into the analog image signals by the D/A converter,
    further comprising a variable gain amplifier operatively connected between the imaging device and the ND converter of the image signal processing circuit,
    wherein a gain of the variable gain amplifier is controlled by the microcomputer to provide an optimum gain value falling within an effective gain range provided by a data table within the EEPROM and which does not permit a lowering of the SN ratio, and
    further comprising a variable gain amplifier amplifying the analog image signals from the imaging device before said A/D converter receives said analog image signals.

6. A camera that captures an image with an imaging part and displays the image on a displaying device, wherein the camera determines a brightness level of video signals obtained by the imaging part and automatically corrects the video signals according to the determined brightness level and outputs the corrected video signals to the displaying device, and wherein the camera automatically corrects the video signals according to the determined brightness level by offsetting the brightness levels of the video signals by a correction value through correction processing, and further comprising:

a variable gain amplifier that amplifies signals outputted from an imaging part; and a gain controlling part that controls a gain of the variable gain amplifier according to the brightness level of the video signals, wherein the gain of the variable gain amplifier is controlled to an optimum gain value falling within an effective gain range and which does not permit a lowering of an SN ratio.

7. A method for adjusting a brightness level of an image captured on a camera and displayed on a display device, said method comprising:

determining a brightness level of video signals obtained by an imaging part and automatically correcting the video signals according to a determined brightness level; and outputting the corrected video signals to the display device, wherein the camera automatically corrects the video signals according to the determined brightness level by offsetting the brightness levels of the corrected video signals by a correction value through correction processing, wherein a microcomputer within the camera provides an optimum gain value falling within an effective gain range provided by a data table within an EEPROM of the computer and which does not permit a lowering of an SN ratio.

8. A method for adjusting a brightness level of an image captured on a camera and displayed on a display device, said method comprising:

determining a brightness level of video signals obtained by an imaging part and automatically correcting the video signals according to a determined brightness level; and outputting the corrected video signals to the display device, wherein the camera automatically corrects the video signals according to the determined brightness level without lowering an SN ratio, wherein a gain controlling part of the camera controls a gain of a variable gain amplifier within the camera according to the determined brightness level of the video signals, and the gain of the variable gain amplifier is controlled to an optimum gain value falling within an effective gain range.

9. A camera comprising:
a taking lens;
a diaphragm operatively connected to the taking lens;
an imaging device operatively connected to the taking lens and the diaphragm;
an image signal processing circuit having
an A/D converter for converting analog image signals from the imaging device into digital image signals,
a gamma correcting circuit,
an image signal processing circuit adapted to perform gamma processing and chroma signal processing on the digital image signals, and
a D/A converter adapted to convert the digital image signals into analog image signals;
a display device controlling circuit adapted to output the analog image signals to a displaying device according to the analog image signals output from the image signal processing circuit; and
a microcomputer operatively connected to an EEPROM,
wherein said microcomputer is adapted to control the diaphragm according to the digital image signals from the image signal processing circuit, adapted to send shutter speed control signals to the imaging device for controlling camera shutter speed, and adapted to automatically determine if a determined brightness level of the digital image signals is lower than a predetermined value, and
wherein said microcomputer is adapted to select a predetermined correction value from the EEPROM according to the determined brightness level of the digital image signals, and to output a command control signal to the image signal processing circuit for automatic correction processing of the digital image signals without lowering a SN ratio and before the digital image signals are converted into the analog image signals by the D/A converter,
wherein the imaging device is directly connected to the A/D converter of the image signal processing circuit.

10. A camera comprising:
a taking lens;
a diaphragm operatively connected to the taking lens;
an imaging device operatively connected to the taking lens and the diaphragm;
an image signal processing circuit having
an A/D converter for converting analog image signals from the imaging device into digital image signals,
a gamma correcting circuit,
an image signal processing circuit adapted to perform gamma processing and chroma signal processing on the digital image signals, and
a D/A converter adapted to convert the digital image signals into analog image signals;
a display device controlling circuit adapted to output the analog image signals to a displaying device according to the analog image signals outPut from the image signal processing circuit; and
a microcomputer operatively connected to an EEPROM,
wherein said microcomputer is adapted to control the diaphragm according to the digital image signals from the image signal processing circuit, adapted to send shutter speed control signals to the imaging device for controlling camera shutter speed, and adapted to automatically determine if a determined brightness level of the digital image signals is lower than a predetermined value, and
wherein said microcomputer is adapted to select a predetermined correction value from the EEPROM according to the determined brightness level of the digital image signals, and to output a command control signal to the image signal processing circuit for automatic correction processing of the digital image signals without lowering a SN ratio and before the digital image signals are converted into the analog image signals by the D/A converter,
wherein the signals from the imaging device are sent to the A/D converter of the image signal processing circuit without passing through a variable gain amplifier.

* * * * *